United States Patent Office 3,017,369
Patented Jan. 16, 1962

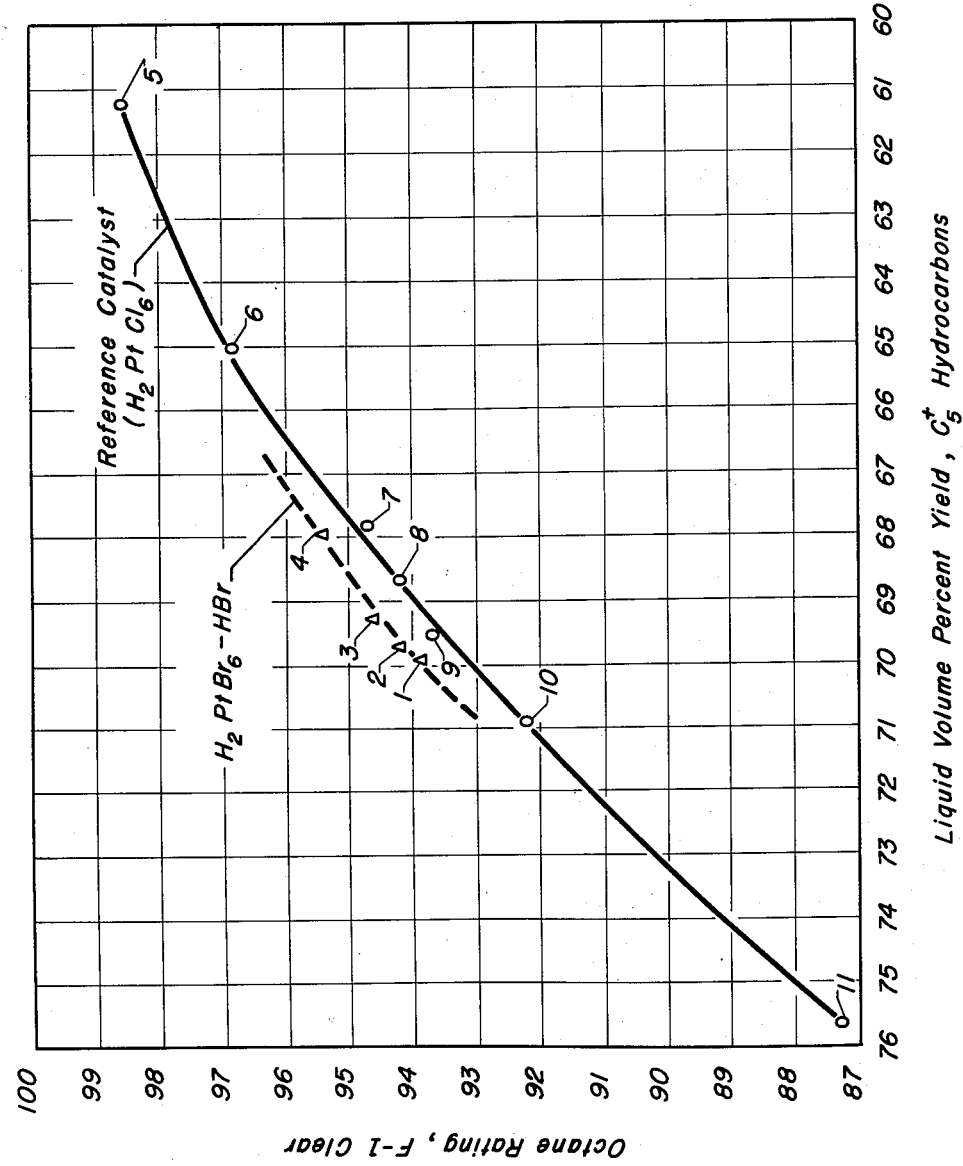

3,017,369
CATALYST MANUFACTURING WITH CONTROL OF HALOGEN
William G. Nixon, Westchester, Ill., assignor to Universal Oil Products Company, Des Plaines, Ill., a corporation of Delaware
Filed Apr. 2, 1959, Ser. No. 803,789
9 Claims. (Cl. 252—441)

The present application is a continuation-in-part of my copending application, Serial Number 675,828, filed August 2, 1957. The present invention relates, in its most broad scope, to the manufacture of a refractory inorganic oxide catalytic composite containing a noble metal component, and particularly a catalytic composite comprising platinum.

More specifically, the present invention relates to a particular method of impregnating a refractory inorganic oxide carrier material with a noble metal component, whereby the combined halogen content of the final catalytic composite may be readily controlled. In addition, the catalyst produced in accordance with the method of the present invention, exhibits a greater degree of activity and stability than catalysts produced by other well-known means, notwithstanding the fact that the catalyst of the present invention comprises lesser total quantities of catalytically active components. The method of the present invention employs a mixture of bromoplatinic and hydrobromic acids in the impregnating solution, and a calcination procedure designed to yield a final catalytic composite substantially free from bromine and compounds thereof.

Industries such as the pharmaceutical, detergent, petroleum, insecticidal, etc. utilize platinum-containing catalysts in a variety of processes to promote a multitude of reactions among which are hydrogenation, cyclization, cracking, polymerization, dehydrogenation, sulfonation, alkylation, oxidation and isomerization. Whatever the process and the reactions involved, it is extremely essential for commercial acceptance that the particular catalyst therein employed exhibit a high degree of activity, and the prolonged capability to perform its intended function to the desired extent. Of necessity, therefore, the catalyst must be homogeneous as to composition, and particularly uniform as to the concentrations of the various individual catalytic components.

Since the complicated mechanism of catalysis is not fully understood, it is extremely difficult to predict, without extensive, tedious experimentation, the final results of any process which utilizes a particular catalyst. Furthermore, catalysis is of such a nature that significant differences in results may be obtained through the utilization of seemingly insignificant changes in the manufacturing procedure. When the final results are realized, the changes effected in the manufacturing procedure are no longer considered insignificant. The manufacture of catalyst is equally unpredictable from the standpoint of consistently producing an acceptable catalyst having a particularly desired activity, and comprising the desired concentrations of the various catalytically active components. The best manufacturing method quite often produces a catalyst which is unacceptable due to a low degree of activity and/or non-homogeneity of composition, and it becomes necessary to employ a precise combination of chemical and physical conditions in the manufacturing process. Regardless of the final composition of the finished catalyst, there is a high degree of criticalness attached to each and every phase of the manufacturing process.

The object of the present invention is to produce a platinum-containing catalyst, the final composition of which is readily controlled, having a degree of activity and stability (capability to function for an extended period of time) which have heretofore not been obtained.

In its most broad embodiment, the present invention provides a method for manufacturing a noble metal-containing refractory inorganic oxide catalytic composite which comprises commingling hydrobromic acid with the bromo-metallic acid corresponding to said noble metal, impregnating said refractory inorganic oxide with a quantity of the resulting acidic mixture to yield a final catalytic composite containing from about 0.01% to about 2.0% by weight of said noble metal and calcining the impregnated inorganic oxide at a temperature in excess of about 400° C.

In another embodiment, the present invention relates to a method for manufacturing a platinum-containing refractory inorganic oxide composite which comprises commingling hydrobromic acid with bromoplatinic acid, impregnating said refractory inorganic oxide in the absence of added chlorine and compounds thereof, with a quantity of the resulting acidic mixture to yield a final catalytic composite containing from about 0.01% to about 2.0% by weight of platinum, and calcining the impregnated refractory inorganic oxide at a temperature in excess of 400° C.

In a specific embodiment, the present invention relates to a method for manufacturing an alumina-platinum catalytic composite containing combined halogen selected from the group consisting of chlorine, fluorine and mixtures thereof, which method comprises impregnating an alumina-combined halogen composite with an acidic mixture of hydrobromic and bromoplatinic acids in the absence of added chlorine and compounds thereof, said acidic mixture containing bromoplatinic acid in an amount to yield a final catalytic composite containing from about 0.01% to about 2.0% by weight of platinum, calcining the resultant impregnated composite at a temperature in excess of 400° C. and recovering a calcined alumina-platinum-combined halogen catalytic composite free from bromine and compounds thereof.

In its most specific embodiment the present invention provides a method for manufacturing an alumina-platinum catalytic composite which comprises impregnating alumina containing combined halogen from the group consisting of fluorine, chlorine and mixtures thereof, in the absence of added chlorine and compounds thereof, with an acidic mixture of aqueous solutions of bromoplatinic acid and hydrobromic acid containing hydrogen bromide in a weight ratio of 2:1 to about 3:1 based upon the weight of platinum, said acidic mixture containing sufficient bromoplatinic acid to yield a final catalytic composite containing about 0.01% to about 2.0% by weight of platinum, and calcining the resultant impregnated composite at a temperature within the range of from about 400° C. to about 600° C. whereby said catalytic composite is recovered substantially completely free from bromine and compounds thereof.

Although the method of the present invention is specifically directed to catalytic composites containing platinum, other noble metals, such as iridium, rhodium, ruthenium, and particularly palladium, and catalytic composites containing minor quantities of other metals can be advantageously improved through its use. Other metals can be composited with the refractory inorganic oxide in small amounts and subsequently employed therewith as components of the catalyst, and these catalysts can be improved in activity and stability by the method of the present invention. Catalytic composites which can be manufactured to a high degree of activity and stability by the method of the present invention comprise metal components such as, but not limited to, vanadium, chromium, tungsten, cobalt, copper, sodium and other alkali metals, silver, rhenium, molybdenum, nickel, cesium, other metals of groups VI and VIII of the periodic table, mixtures of two or more, etc. The metal component may exist either in the elemental state or in a combined form, such as the halide, sulfate, etc. It is understood that the benefits afforded catalysts containing different metal components are not equivalent, and that the effects of employing the method of the present invention with a particular metal component, are not necessarily the same effects observed with regard to some other metal component, or mixtures of metal components.

Generally, the quantity of the noble metal component composited with the catalyst is small compared to the quantities of the other components combined therewith. For example, platinum and/or palladium and other noble metals will generally comprise a total of from about 0.01% to about 5% by weight of the entire catalytic composite, and usually from about 0.1% to about 2.0% by weight thereof. The utilization of other metal components is dependent upon the use for which the particular catalyst is intended, and these other metals will usually be present in minor concentrations of about 0.01% to about 1.0%, or in particular instances, up to about 5.0%. In any case, however, the concentration of the total metal components within the composite will be small, and will generally be within the range of from about 0.01% to about 10% by weight of the final catalytic composite.

Heretofore, it has been common practice to add the noble metal to the refractory inorganic oxide in any suitable manner, an often used method being the utilization of an aqueous solution of the chloro-metallic acid corresponding to the desired noble metal component. For example, when platinum and/or palladium is to be an integral component of the final catalytic composite, chloroplatinic and/or chloropalladic acid is employed as the impregnating solution to deposit such catalytically active metallic component within the composite. Although suitable, the use of fluoroplatinic acid, or fluoropalladic acid, is not extensively employed; difficulties which are peculiar to fluorine preclude the advantageous utilization of these acids. The use of the chloro-metallic acids is considered to be especially convenient when the final catalyst is to comprise combined chloride. When combined fluoride is to be a component of the catalyst, it is generally combined with the refractory inorganic oxide carrier material prior to the addition thereto of the metallic component. The chloro-metallic acids are employed in concentrations which will yield a final catalytic composite containing the desired quantity of metallic component. I have found that a more active catalyst, having a greater degree of stability, is produced when an aqueous solution of the bromo-metallic acids is employed, as the source of the noble metal component, in admixture with a minor amount of hydrobromic acid. Thus, when the catalyst is to contain platinum, the impregnating solution will be a mixture of bromoplatinic and hydrobromic acids; similarly, when palladium is to be an integral component of the catalyst, the inorganic oxide is impregnated with a mixture of hydrobromic and bromopalladic acids. The resulting bromine is removed during a subsequent calcination procedure, and does not appear as a component of the final catalytic composite.

As hereinbefore stated, halogen is generally composited with the catalyst in concentrations of from about 0.1% to about 8% by weight of the total catalyst and may be either fluorine, chlorine, or mixtures of the same. Combined fluoride appears to be less easily removed from the catalyst during the process in which the catalyst is employed, and is, therefore, preferred in many instances. The halogen appears to enter into a particular chemical combination with the other components of the catalyst, and is, therefore, generally referred to as combined halogen. The combined halogen is employed for the purpose of imparting an acid-acting function to the catalyst for the purpose of promoting particular reactions, thereby striking a balance between a variety of such reactions. This is especially desirable within the petroleum industry in those processes employed in the catalytic reforming of hydrocarbons and mixtures thereof. These processes employ a platinum-refractory inorganic oxide catalyst containing combined halogen from the group of chlorine, fluorine and mixtures thereof, to effect the most advantageous balance among reactions involving the dehydrogenation of naphthenes, the dehydrocyclization of paraffins, the hydrocracking of long-chain paraffins, the isomerization of straight-chain paraffins to a more branched-chain configuration, etc. As a result of the constantly changing quantity of combined chloride in the period of time during which the catalyst is employed, the ability of the catalyst to perform its intended function varies. Further, the combined halogen requirement is inherently changed as the process is effected over an extended period of time, and the catalyst becomes aged. Fluorine possesses the phenomenal propensity to remain deposited within the composite during operation, and is the preferred halogen in many instances. Chlorine is somewhat susceptible to leaching from the composite, and as the operation progresses, there often arises the necessity for the addition of a chloride-containing compound to supplement that which is lost. It is essential to acceptable performance, therefore, that the combined halogen content of the catalyst at the outset of the operation be strictly controlled, being dependent upon the type and degree of reaction balance and overall operation desired. As hereinafter set forth, the control of combined halogen concentration, within the catalyst, requires extensive, tedious manufacturing procedures when a halogen, other than bromine, is present within the solutions employed for the purpose of impregnating the refractory carrier material. The method of the present invention successfully eliminates these tedious procedures, while providing for control of combined halogen, and, at the same time, yields a catalyst having greater stability and activity.

Whatever the metal component, it is generally composited with a refractory inorganic oxide such as alumina, silica, zirconia, magnesia, boria, thoria, strontia, titania, etc., and mixtures of two or more including silica-alumina, alumina-boria, silica-thoria, silica-alumina-zirconia, etc. It is understood that the refractory inorganic oxides hereinabove set forth are intended to be illustrative rather than limiting unduly the method of the present invention. It is further understood that these refractory inorganic oxides may be manufactured by any suitable method including separate, successive, or co-precipitation methods of manufacture, or they may be naturally occurring substances, such as clays or earths, which may or may not be purified or activated with special treatment. The preferred refractory inorganic oxide for use in the process of the present invention comprises alumina: The utilization of other refractory material will generally be dependent upon the particular function desired of the final catalytic composite. In the instant specification and appended claims, the term alumina is employed to mean porous aluminum oxide in all states of oxidation and in all states of hydration, as well as aluminum hydroxide. The alumina may be synthetically prepared or naturally occurring, and may be of the crystalline or gel type. The alumina may be prepared by adding a suitable alkaline reagent such as ammonium hydroxide to a salt of aluminum such as aluminum chloride, aluminum sulfate, aluminum carbonate, etc., in an amount to form aluminum hydroxide which, upon drying, is converted to alumina. The alumina may be formed into any desired shape such as spheres, pills, extrudates, powder, granules, etc. A preferred form of alumina is the sphere, and alumina spheres may be continuously manufactured by the oil-drop method which consists of passing droplets of an alumina sol into an oil bath maintained at an elevated temperature, retaining the droplets in said oil bath until the droplets set to firm hydrogel spheroids. The spheres are continuously withdrawn from the oil bath and immediately thereafter subjected to specific aging treatments to impart certain desired physical characteristics thereto. It is not essential to the method of the present invention that the alumina be prepared in any particular manner, and any suitable method will suffice.

Heretofore, the halogen has been added to the alumina through any suitable means, and either before or after the addition thereto of the other catalytic components. While the halogen may be added as gaseous chloride or fluorine, in some instances it is often added as an aqueous solution of a hydrogen halide. Halogen is often added to the refractory oxide before the other components are composited therewith, and this is accomplished through the use of an acid such as hydrogen fluoride and/or hydrogen chloride. In some cases, volatile salts such as ammonium fluoride, ammonium chloride, etc. are employed. In other cases, the alumina is prepared from the aluminum halide, which method affords a convenient manner of compositing the halogen while at the same time, manufacturing the alumina. Halogen is also generally composited with the alumina during the impregnation of the latter with the active metallic component.

None of the methods of halogen addition, hereinabove set forth, offer adequate means for controlling the concentration of the total combined halogen in the final catalytic composite. This is particularly the situation when the platinum component is added to the refractory inorganic oxide as a solution of chloroplatinic acid, which means of platinum addition is commonly employed. Chloroplatinic acid contains approximately 52% by weight of chlorine, a greater portion of which will remain on the refractory inorganic oxide, along with the platinum, as combined chloride. Since the quantity of chloroplatinic acid is chosen to deposit a desired amount of platinum, a carrier material impregnated in this manner must necessarily be subjected to subsequent treatments for the removal of excess chloride. There is involved added expense both in time and materials, not to mention the possibilities of damaging the catalyst through multifarious handling procedures, and the loss of costly components, particularly platinum, through attrition, leaching, abrasion, crushing, etc. Catalysts so produced lack uniformity of composition particle to particle, as well as homogeneity within each individual particle.

The process of the present invention insures uniformity of composition of the final catalytic composite while providing a method for controlling the quantity of halogen contained therein, regardless of the desired concentrations of the other components of the catalyst. In accordance with the method of the present invention, the platinum is combined with the refractory inorganic oxide, for example alumina, and other components in the form of bromoplatinic acid; the bromine or combined bromide being subsequently removed during treatments designed to convert the impregnated composite to its final state, and is not retained within the final catalytic composite as a component thereof.

In accordance with the method of the present invention, all the combined halogen, which is to be an integral part of the final catalyst, is composited with the refractory inorganic oxide prior to the impregnating procedure employed to effect the deposition of the catalytically active component. For example, alumina spheres may be prepared from an aluminum chloride hydrosol by the oil-drop method hereinbefore described. Generally, the finished alumina spheres, following a high-temperature calcination procedure, contain combined chloride in excess of that desired, and beneficial, in the final catalytic composite. Thus, when the platinum component is added in the form of chloroplatinic acid, additional chloride is deposited within the composite. Heretofore, it was necessary to remove this excess combined chloride via extensive, arduous procedures such as repeated washings with water, or through the use of steam at elevated temperatures. Such treatments tend to exert detrimental effects upon the deposited platinum component and its combination with the other components of the catalyst. In addition, it is virtually impossible to control such procedures in order to obtain the desired quantity of total combined halogen within the final catalytic composite. Through the method of the present invention, the desired quantity of combined halogen, whether chlorine, fluorine or mixtures thereof, is composited with the alumina prior to the impregnating procedure. To illustrate, alumina, containing chloride in a desired quantity, is commingled with a sufficient quantity of ammonium fluoride to yield a final catalytic composite containing from about 0.01% to about 8.0% by weight of total halogen. Similarly, an alumina-combined fluoride is commingled with a sufficient quantity of ammonium chloride to yield the desired total amount of combined halogen. The particular method by which the chlorine, fluorine, or mixtures of the same, is combined with the alumina is not essential to the method of the present invention. Further, the alumina, or other refractory carrier material, may be prepared in any suitable manner; in accordance with the several embodiments of this inventon, the essential feature involves preparing the carrier material to contain all the combined halogen prior to the catalytic impregnating procedure.

As hereinbefore stated, the present invention affords a method for effecting control of the concentration of the various components of the catalyst. The method consists essentially of employing bromoplatinic acid as the sole source of the quantity of platinum which is desired to be composited within the final catalyst. The bromine, or any resulting compounds thereof, is effectively, completely removed, via a calcination procedure effected at a temperature in excess of 400° C., and more particularly, at a temperature within the range of about 400° C. to about 600° C. I have further found that the benefits, afforded through the utilization of bromoplatinic acid, are enhanced when the refractory oxide carrier material is impregnated with hydrobromic acid being present within the impregnating solution. The exact nature of the physical change, which is effected through the utilization of minor amounts of hydrobromic acid, and particularly in admixture with bromoplatinic acid, the sole source of the platinum component, is not precisely known and understood. It is believed, however, that the bromoplatinic acid and hydrobromic acid form a peculiar physical association which take the form of a chemical complex having the ability to penetrate throughout the entire structure of the refractory oxide carrier material. This complex is readily destroyed during the subsequent calcination procedure, whereby the bromine, and compounds thereof, are readily removed, and the desired quantity of platinum becomes uniformly distributed throughout the carrier material, rather than being deposited as a relatively thin shell, leaving the center of the carrier material virtually devoid of platinum. This beneficial result is not realized through the use of chloroplatinic acid, in which instance the major portion of the platinum becomes deposited upon the surface of the carrier material, not penetrating uniformly throughout. In addition, there results the deposition of excessive quantities of combined chloride which requires subsequent treatments to effect the removal thereof.

Briefly, a specific embodiment of the method of the present invention for manufacturing a catalytic composite, such as a platinum-alumina-chloride-fluoride catalyst, comprises drying alumina, which has been prepared in any suitable manner, and which may have been specially treated for the purpose of imparting thereto particularly desired physical characteristics. The alumina is dried at any suitable temperature within the range of from about 50° C. to about 200° C., and may contain at least a portion of the desired quantity of combined halogen, either chlorine, fluorine, or both.

The dried alumina is then composited with halogen, either chlorine, fluorine, or both, in the desired quantity, if such halogen is not already combined with the alumina. The total concentration of halogen in the final composite will be within the range of from about 0.1% to about 8.0% by weight of the finished catalyst. When fluoride is to be combined with the catalyst, it is preferred to incorporate the same prior to the compositing of additional halogen as combined chloride: The alumina-fluoride composite is then dried as hereinbefore set forth. The halogen may be composited by any suitable means, some of which have been previously described.

The platinum is added to the alumina-combined halogen composite in the form of an aqueous solution of bromoplatinic acid containing sufficient platinum to yield a final composite containing from about 0.01% to about 2.0% by weight of platinum. The aqueous solution of bromoplatinic acid is commingled with the alumina-combined halogen composite in the absence of either any alkaline substance, or acidic compounds other than a minor quantity of hydrobromic acid. The hydrobromic acid concentration, in admixture with the bromoplatinic acid, is within the range of a weight ratio of from about 2:1 to about 3:1, based upon the weight of platinum to be composited within the catalyst. The resulting slurry is sufficiently stirred, to obtain intimate mixing of the components, and subsequently dried at a temperature of from about 50° C. to about 200° C.

The drying treatment should be effected gradually to avoid the sudden expulsion of vapors, resulting in the possible rupture of the catalyst structure. Following the drying procedure, the composite is subjected to a calcination treatment at an elevated temperature in excess of 400° C. It is preferred to effect the calcination in the presence of an oxidizing medium, generally air, at a temperature within the range of 400° C. to about 600° C. The bromine, and any resulting compounds, thereof, is removed from the catalyst during the calcination procedure, effected in an atmosphere of air, and the catalytic composite is recovered containing only that particular quantity of chloride and/or fluoride which has been composited prior to the impregnating procedure.

In some instances, it may be desired to subject the final catalytic composite to a reducing treatment in an atmosphere of hydrogen. This added step is of advantage in those situations where the catalyst is designed to be utilized in reforming processes in which the reactions are effected in an atmosphere of hydrogen. Usually, such processes are initiated by circulating a stream of hydrogen through the catalyst prior to introducing the reactant stream thereto. It is not intended that a reducing treatment limit the otherwise broad scope of the present invention.

The following examples are introduced to further illustrate the utility of the present invention, and are not intended to limit the same to the specific materials, conditions and/or concentrations involved.

The catalytically active carrier material employed in the examples consisted of alumina containing combined fluoride. This composite was prepared by the oil-drop method from a mixture of equal volumes of a 28% by weight solution of hexamethylene tetramine in water, and an aluminum chloride sol containing 12% by weight aluminum and 10.8% by weight combined chloride. The fluoride was added in the stated amounts by way of an aqueous solution of hydrogen fluoride, and the mixture was formed into hydrogel spheroids. The spheres were washed, dried to a temperature of 650° C. and subsequently calcined at that temperature.

EXAMPLE I

A 130-gram portion of the calcined spheres was commingled with 99 milliliters of an aqueous solution of chloroplatinic acid containing 10 milligrams of platinum per milliliter, plus 60 milliliters of water. The mixture was evaporated to dryness over a water bath at a temperature of 99° C., and further dried in a rotary drier to a temperature of 200° C. for a period of 3 hours. The chloride concentration was reduced to a level of 0.35% by weight via repeated washings with water to remove chloride in excess of this amount. The composite was thereafter subjected to a calcination treatment, in the presence of air, at a temperature of 500° C., for a period of one hour.

The catalyst portion was subjected to a particular activity-stability test which consisted of passing a standard hydrocarbon charge stock, having a boiling range of about 200° F. to about 400° F., through the catalyst at a liquid hourly space velocity (volumes of hydrocarbon charged per volume of catalyst) of about 2.0, in an atmosphere of hydrogen present in a mol ratio of hydrogen to hydrocarbon of 10:1, for a period of about 10 hours. The reaction zone was maintained at a temperature of 500° C., and under an imposed pressure of 500 p.s.i.g. The reaction zone was cooled and depressured; the catalyst portion removed and analyzed for carbon deposition, an indication of the relative stability of the catalyst. Quite often, highly active catalysts will yield excellent results initially, but are insufficiently stable, and rapidly lose their capacity to function acceptably for prolonged periods of time as a result of the deposition of carbon. The liquid product collected from the reaction zone, over the entire period of the test, was analyzed for octane rating (F–1 Clear). This catalyst portion is representative of platinum-containing catalysts comprising a particular quantity of platinum, and is employed as the reference catalyst for comparing the results obtained from different catalysts manufactured by a variety of methods, and was employed to interpret the results of the catalysts manufactured according to the present invention: The catalyst is indicated in the following Table I as catalyst A.

*Table I*

| | |
|---|---|
| Catalyst designation | A |
| Analysis: | |
|     Platinum, wt. percent | 0.750 |
|     Fluoride, wt. percent | 0.350 |
|     Chloride, wt. percent | 0.310 |
|     Total halide, wt. percent | 0.660 |
| Carbon on tested catalyst, wt. percent | 0.69 |
| Octane rating of product, F–1 | 94.0 |
| Excess receiver gas, s.c.f./bbl | 860 |
| Excess debutanizer gas, s.c.f./bbl | 435 |
| Total excess gas, s.c.f./bbl | 1295 |
| Debutanizer gas ratio | 0.340 |

For the purpose of having a clear understanding of the data, several definitions are presented below:

(1) The excess receiver gas is that quantity of gas in excess of the amount required to maintain the desired pressure in the reaction zone. Analyses have shown that this gas is, for all practical purposes, substantially pure hydrogen (approximately 95 mol percent).

(2) The excess debutanizer gas is that gas which is composed of light paraffins, methane, ethane, propane and butane, and some hydrogen, and results mainly from the hydrocracking reactions effected within the reaction zone.

(3) The debutanizer gas ratio is the ratio of excess debutanizer gas to total excess gas, and is indicative of the balance effected among the various reactions, and the relative yield of desirable product in the effluent from the reaction zone—i.e.: the lower the ratio, the greater the yield of liquid product.

A second catalyst portion was prepared strictly in accordance with the procedure as hereinabove set forth in regard to catalyst A. This second catalyst portion was subjected to a series of the previously described activity-stability test, in which series the operating conditions (generally the liquid hourly space velocity and the catalyst temperature) were varied. For each individual test of the series, the volumetric yield of pentanes and heavier hydrocarbons was determined, and F-1 Clear octane ratings were obtained on this portion of the total reformed product. The results of this series of activity-stability tests are illustrated, in part, in the accompanying figure. That part which is shown is the relationship between the volumetric yield of reformed product comprising pentanes and heavier hydrocarbons, and the octane rating (F-1 Clear) of this particular portion. This range of data is indicated in the figure as points 5, 6, 7, 8, 9, 10 and 11, through which is drawing the solid curve referred to as the "Reference Catalyst" ($H_2PtCl_6$). It is immediately noted that this curve follows the basic theoretical principle that an increase in octane rating necessitates an increase in operating severity resulting inherently in a substantial decrease in the volumetric yield of product having the increased octane rating.

EXAMPLE II

Four platinum-containing catalysts were prepared, in accordance with the method of the present invention, having the following varying compositions:

*Table II*

| Catalyst Designation | 1 | 2 | 3 | 4 |
| --- | --- | --- | --- | --- |
| Composition, wt. percent: | | | | |
| Platinum | 0.835 | 0.732 | 0.835 | 0.732 |
| Chloride | 0.130 | 0.130 | 0.180 | 0.260 |
| Fluoride | 0.400 | 0.500 | 0.400 | 0.500 |
| Total Halide | 0.530 | 0.630 | 0.580 | 0.760 |

These catalysts were prepared in accordance with the procedure previously described, and likewise employed a carrier material comprising alumina containing combined fluoride. The composite was prepared by the oil-drop method, the fluoride being added, in the amounts indicated, through the utilization of aqueous solutions of hydrogen fluoride, prior to the deposition of the platinum component. The final carrier materials were dried to a temperature of 650° C., and subsquently calcined at that temperature for a period of one hour.

For each catalyst portion, 130 grams of the carrier material was impregnated with aqueous solutions of bromoplatinic acid (containing 10 mg. of platinum per ml.) in an amount to yield a final catalyst having the platinum concentrations indicated in Table II, and hydrobromic acid in an amount of a weight ratio of about 2.5:1 based upon the weight of the platinum. Following an evaporation upon a steam bath, to effect visual drying of the composite, the catalysts were dried in a rotary drier at a temperature of 200° C. The catalyst portions were subsequently subjected to a calcination treatment, in the presence of air, at a temperature of 500° C. for a period of one hour.

The four catalyst portions were subjected to the activity-stability test at a liquid hourly space velocity of 2.0, in an atmosphere of hydrogen present in a mol ratio of hydrogen to hydrocarbon of 10:1, for a period of about 10 hours. The reaction zone was maintained at a temperature of 500° C., and under an imposed pressure of 500 p.s.i.g. Since the catalyst portions were designedly prepared to be of varying composition, the operating conditions of the activity-stability test were identical for each particular catalyst, and the same as those employed in Example I. In the following Table III, the results of the activity-stability tests are given, along with the results of the carbon deposition and octane rating analyses. The catalysts are designated as 1, 2, 3 and 4, to correspond to the catalyst concentrations given in Table II.

*Table III*

| Catalyst Designation | 1 | 2 | 3 | 4 |
| --- | --- | --- | --- | --- |
| Carbon on Tested Catalyst, wt. Percent | 0.50 | 0.45 | 0.64 | 0.53 |
| Octane Rating of Product, F-1 Clear | 93.9 | 94.2 | 94.6 | 95.4 |
| Liquid Yield, vol. percent | 69.9 | 69.7 | 69.2 | 67.9 |
| Excess Receiver Gas, s.c.f./Bbl | 940 | 891 | 897 | 862 |
| Excess Debutanizer Gas, s.c.f./Bbl | 404 | 429 | 420 | 451 |
| Total Excess Gas, s.c.f./Bbl | 1,344 | 1,320 | 1,317 | 1,313 |
| Debutanizer Gas Ratio | 0.301 | 0.325 | 0.319 | 0.343 |

In addition, the yield-octane relationship of each catalyst portion is indicated in the accompanying figure as points 1, 2, 3 and 4, through which is drawn the broken line designated as "$H_2PtBr_6$—HBr". As hereinbefore indicated, in reference to the solid line representing the "Reference Catalyst" of Example I, the catalysts prepared in accordance with the present invention definitely follow the established principle that an increase in octane rating is accompanied by a decrease in liquid volumetric yield. However, it is immediately noted that the catalyst of the present invention will produce a greater volumetric yield at the same octane rating, or conversely, a greater octane rating when operating to produce the same volumetirc yield. Since the catalysts of the present invention were of varying composition, and the operating conditions of the activity-stability tests thereof were identical, it is evident that the totally unexpeced and unobvious results are attributed solely to the method of manufacture. Those platinum-containing catalysts prepared in accordance with the method of the present invention, wherein the total quantity of halogen designed to be an ultimate component of the final catalyst is combined prior to the impregnating procedure for deposition of the platinum component, are shown to result in a significantly more advantageous yield-octane relationship. Catalysts prepared through the utilization of bromoplatinic and hydrobromic acids, during the impregnation procedure, can be employed, therefore, at lower severities of operation while producing results comparable to catalysts prepared through the more common procedure. Obviously, there inherently results a catalyst which is more stable during operation, and thus, capable of performing its intended function for an extended period of time without costly regeneration.

The greater stability and activity of the catalysts of the present invention are substantiated by comparing the debutanizer gas ratios and carbon depositions resulting from the activity-stability tests to which the catalysts of the present invention, and that prepared with chloroplatinic acid, were subjected. These data are repeated in the following Table IV for convenience in making such comparison.

*Table IV*

| Catalyst Designation | A | 1 | 2 | 3 | 4 |
| --- | --- | --- | --- | --- | --- |
| Carbon Deposition of Tested Catalyst, wt. percent | 0.69 | 0.50 | 0.45 | 0.64 | 0.53 |
| Debutanizer Gas Ratio | 0.340 | 0.301 | 0.325 | 0.319 | 0.343 |

It is immediately noted that the catalyst of the present invention (designated as catalysts 1, 2, 3 and 4), in all instances, incurred a lesser degree of carbon deposition that the catalyst prepared utilizing chloroplatinic acid in the impregnating solution (designated as catalyst A). Also, the debutanizer gas ratios, experienced through the utilization of the catalyst of the present invention are either lower than, or substantially equal to, that of the reference catalyst. When considered in conjunction with the data illustrated by the accompanying figure, these considerations indicate the enhanced stability and activity of the bromine-prepared catalyst while at the same time affording a substantial advantage in product quality and quantity.

The foregoing specification and examples clearly illustrate the method of the present invention and the benefits afforded through the utilization thereof. It is not intended that the present invention be limited unduly, by the theoretical considerations, particular reagents, concentrations and/or operating conditions beyond the scope and spirit of the appended claims.

I claim as my invention:

1. A method for manufacturing a noble metal-containing refractory inorganic oxide catalytic composite which comprises commingling hydrobromic acid with the bromometallic acid corresponding to said noble metal, impregnating said refractory inorganic oxide with a quantity of the resulting acidic mixture to yield a final catalytic composite containing from about 0.01% to about 2.0% by weight of said noble metal and calcining the impregnated inorganic oxide at a temperature in excess of about 400° C.

2. A method for manufacturing a platinum-containing refractory inorganic oxide catalytic composite which comprises commingling hydrobromic acid with bromoplatinic acid, impregnating said refractory inorganic oxide with a quantity of the resulting acidic mixture to yield a final catalytic composite containing from about 0.01% to about 2.0% by weight of platinum and calcining the impregnated refractory inorganic oxide at a temperature in excess of about 400° C.

3. A method for manufacturing a platinum-containing refractory inorganic oxide composite which comprises commingling hydrobromic acid with bromoplatinic acid, impregnating said refractory inorganic oxide in the absence of added chlorine and compounds thereof, with a quantity of the resulting acidic mixture to yield a final catalytic composite containing from about 0.01% to about 2.0% by weight of platinum, and calcining the impregnated refractory inorganic oxide at a temperature in excess of 400° C.

4. The method of claim 3 further characterized in that said refractory inorganic oxide comprises alumina.

5. The method of claim 4 further characterized in that said alumina contains combined halogen selected from the group consisting of fluorine, chlorine and mixtures thereof.

6. A method for manufacturing an alumina-platinum catalytic composite containing combined halogen selected from the group consisting of chlorine, fluorine and mixtures thereof, which method comprises impregnating an alumina-combined halogen composite with a mixture of hydrobromic acid and bromoplatinic acid in the absence of added chlorine and compounds thereof, said mixture containing bromoplatinic acid in an amount to yield a final catalytic composite containing about 0.01% to about 2.0% by weight of platinum, calcining the resultant impregnated composite at a temperature in excess of 400° C. and recovering a calcined alumina-platinum-combined halogen catalytic composite free from bromine and compounds thereof.

7. The method of claim 6 further characterized in that said bromoplatinic acid-hydrobromic acid mixture contains hydrogen bromide in a weight ratio in excess of about 2:1, calculated on the basis of the platinum present in said bromoplatinic acid.

8. The method of claim 6 further characterized in that said impregnated alumina-combined halogen composite is calcined at a temperature of from about 400° C. to about 600° C.

9. A method for manufacturing an alumina-platinum catalytic composite which comprises impregnating alumina containing combined halogen from the group consisting of fluorine, chlorine and mixtures thereof, in the absence of added chlorine and compounds thereof, with a mixture of aqueous solutions of bromoplatinic acid and hydrobromic acid containing hydrogen bromide in a weight ratio of 2:1 to about 3:1 based upon the weight of platinum, said mixture containing bromoplatinic acid in an amount to yield a final catalytic composite containing about 0.01% to about 2.0% by weight of platinum, and calcining the resultant impregnated composite at a temperature within the range of from about 400° C. to about 600° C. whereby said catalytic composite is recovered substantially completely free from bromine and compounds thereof.

References Cited in the file of this patent

UNITED STATES PATENTS

| | | |
|---|---|---|
| 2,566,521 | Haensel | Sept. 4, 1951 |
| 2,848,377 | Webb | Aug. 19, 1958 |